May 14, 1946. E. VENABLE 2,400,180
AIR PURIFYING APPARATUS
Filed April 8, 1937
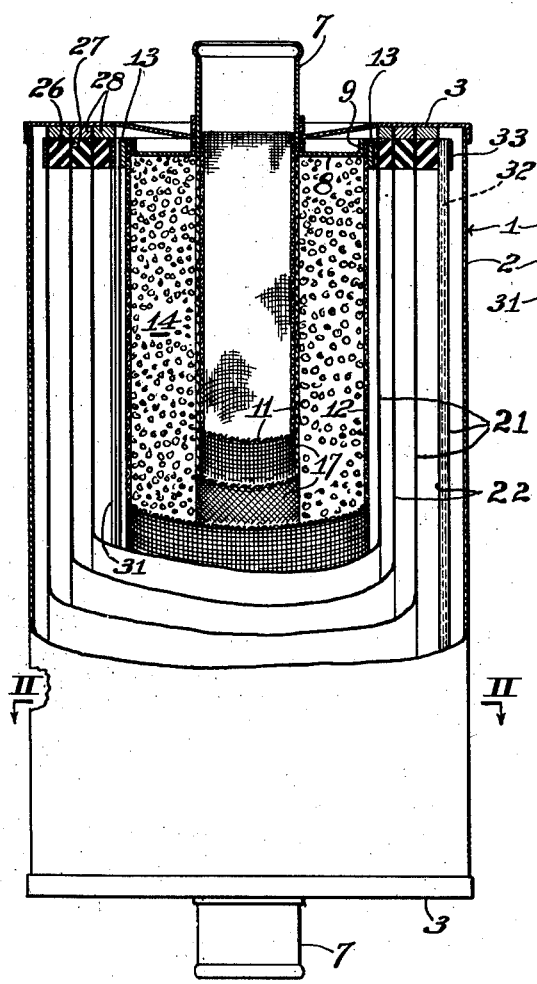
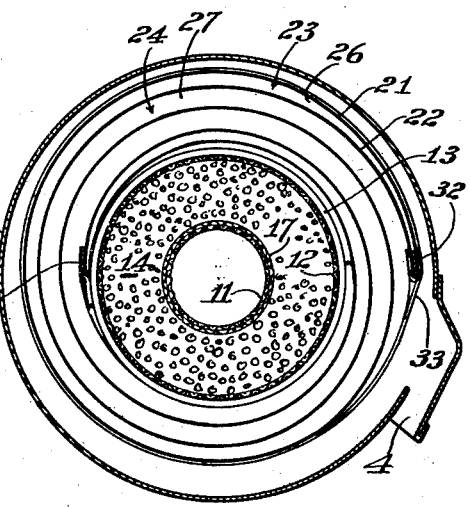
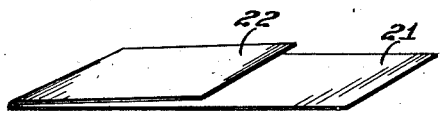
WITNESSES
A. B. Wallace
V. A. Peckham
INVENTOR.
Emerson Venable
BY Brown, Critchlow & Flick
his ATTORNEYS.

Patented May 14, 1946

2,400,180

UNITED STATES PATENT OFFICE 2,400,180

AIR-PURIFYING APPARATUS

Emerson Venable, Wilkinsburg, Pa., assignor to Mine Safety Appliances Company, Pittsburgh, Pa., a corporation of Pennsylvania Application April 8, 1937, Serial No. 135,737

5 Claims. (Cl. 183—73)

This invention relates to the purifying of air to render it fit for breathing, and more particularly to filtering apparatus used in respirators and breathing apparatus for that purpose.

A serious problem commonly encountered in the use of respirators is the high resistance to breathing which is offered, either initially or after use, by the air-purifying and filtering apparatus or the like through which air is drawn to breathing apparatus worn by the individuals. That is, the filtering and purifying elements through which air must be drawn by a wearer may offer so much resistance to the passage of the air as to cause labored breathing which reduces physical efficiency.

It is among the objects of this invention to provide air-purifying apparatus, for use with breathing apparatus, which possesses an initially low breathing resistance; which does not acquire a substantial increase in breathing resistance with use; which is relatively small and compact, light in weight, and inexpensive to make; and which includes an air-filtering element of strong, dependable and simple construction and of relatively great area.

The preferred embodiment of the invention is illustrated in the accompanying drawing, in which Fig. 1 is a side view, partly in section, of my air-purifying apparatus; Fig. 2 is a horizontal section taken on the line II—II of Fig. 1; and Fig. 3 is a perspective view of the filter material before it is rolled to form a filter element.

The invention is particularly applicable to canisters of the general type disclosed in United States Patent No. 1,501,286 granted to Frank J. Logan on July 15, 1924, and will therefore be described, by way of exemplification, with reference to canisters of that type. Such canisters, generally considered, comprise a foraminous body member spaced from and surrounding an inner foraminous member, usually in the form of a perforated tube the end of which provides an outlet for purified air. Surrounding the body and so associated with it that all of the air passing through the canister must pass through it is an air-filtering element. A casing may be disposed about the body member and filtering element to protect them, the casing having an inlet for impure air. The space between the body and inner members may be, and usually is, filled with material adapted to remove toxic or harmful gases from the air passed through the canister. The present invention is concerned with improvements in the filtering element of such canisters.

In accordance with this invention particulate matter, such as toxic dusts and other harmful solids and vapors, is removed from air to render it fit for breathing by providing an air-purifying canister, having an inlet for impure air and an outlet for purified air, with a filter element having an effective area materially in excess of common practice whereby to allow sufficient air to pass through it for substantially unrestricted breathing, and so positioned and arranged in the canister construction that all of the air passed through the canister will pass through the filter element. In other words, the area of the filter element provided by this invention is so great that sufficient air can be drawn therethrough for breathing purposes without meeting the material resistance encountered heretofore when filter elements of substantially less area have been used. Likewise, the area of the filter element is so great that breathing resistance remains adequately low even though the pores in the element become partly clogged by particulate matter filtered out of the air passed through the filter. The form of the filter element is such that it is subjected to a minimum of distortion, and therefore there is practically no danger of its failing because of cracks.

Referring now to Figs. 1 and 2 of the drawing, a casing 1, preferably of generally cylindrical form, is formed from a shell 2 closed at its ends by tightly fitting caps 3 and is provided in its side wall with an inlet port 4 of any suitable form. Each end cap is provided centrally with an opening in which is secured a short tube 7 that projects far enough into the casing to also be secured in the central opening of a disc 8 encircled by an annular flange 9. The two short tubes are connected by a perforated tube 11, such as copper screen, extending a short distance into them. Encircling the flanges 9 of the two discs is a tubular body member or receptacle 12 of foraminous material such as perforated metal, wire screen or the like, which is secured in place by means of rings 13 that clamp the screen against the flanges to which the rings are soldered or otherwise rigidly attached.

Disposed in the space between the perforated receptacle and tube 11 is a charge of air-purifying material 14 of any suitable type for removing toxic or harmful gases from air passed therethrough. A variety of such materials is known at present in this art. The outer ends of the short tubes may be connected by flexible hoses to breathing apparatus (not shown), for example, to the face-piece of a gas mask for supplying purified air thereto. To prevent the air-purifying material from being drawn into tube 11 through its perforations, filter material 17 is wrapped around the tube and should be of such mesh as to accomplish its stated purpose without offering any material resistance to breathing.

Surrounding perforated receptacle 12 in the space between it and the side wall of the casing is an element adapted to filter particulate matter, such as harmful or toxic dusts and the like, out of the air being drawn through the canister by the wearer of the breathing apparatus. Heretofore it has generally been the practice to merely wrap one or more layers of felt or other fibrous material around the body member containing the air-purifying material and in engagement therewith. Felt, however, commonly offers relatively high resistance to breathing, especially when several layers are used, and clogging of its pores with particles filtered out of the air may unduly increase its already high breathing resistance. Also, with the filter material merely wrapped around the body member, the area of the material is relatively small.

It is a feature of this invention that the effective area of my filter element, which is in the form of a sheet of fibrous material, is materially in excess of prior practice without the canister being enlarged, whereby to provide a very large filtering area and to allow sufficient air to pass through the sheet for substantially unrestricted breathing even though some of its pores become clogged in use. Accordingly, the filter element is of generally spiral form in cross section and is provided with a plurality of adjoining spiral air channels that occupy the restricted space between receptacle 11 and casing 1. Each channel is closed at one end so that the impure air must pass through one wall of the channel before it can reach the outlet tubes. In this way the surface area of the filter is greatly increased without enlarging the canister.

Preferably, the filter element is formed from two sheets 21 and 22 of filter material disposed face to face with their body portions spaced apart and their ends sealed together. The two sheets need not be entirely separate sheets, but may be formed by folding a relatively long sheet of filter material upon itself as shown in Fig. 3, in which case the two sheets would be integrally connected at one end. The two sheets are wound spirally around the perforated receptacle to form any desired number of spaced involutions in the path of all the air passing through the canister. Furthermore, as shown in Figs. 2 and 3, sheet 21 that forms the inner layer of the inner involution, i. e., the inner wall of the filter element, is sufficiently longer than the other sheet to form an additional involution which surrounds the outer involution of sheet 22 and thereby forms the outer layer of the outer involution, i. e., the outer wall of the filter. Consequently, of the two adjoining spiral channels 23 and 24 thus formed between the involutions of the sheets, the outer one is sealed at its outer end with its inner end opening into the central area around the perforated receptacle, while inner channel 24 has its inner end sealed and its outer end opening into the space surrounding the filter element between it and the casing.

The walls of the various involutions of the filter element are maintained in spaced relation by spacer members 26 and 27 between the edge portions of the sheets at each end of the element. These spacers are most suitably flexible strips, such as rubber, which are rolled up with the sheets into spiral form, there being one spacer in each channel at each end of the filter element. The ends of the filter are sealed in any suitable manner, such as by sealing wax 28. Preferably, the spacers 26 in outer channel 23 are tapered toward its outer end, while the spacers 27 in inner channel 24 are tapered toward its inner end, whereby the channels acquire corresponding tapers from end to end. The reason for thus varying the cross sectional areas of the two channels is to more effectively accommodate the various rates of air flow found in different sections of the filter element. Thus, outer channel 23 becomes larger as the perforated receptacle is approached in order to take care of the increasing volume of air filtering into that channel as it winds inwardly. On the other hand, inner channel 24 tapers toward its inner end because the volume of impure air therein decreases as its inner end is approached, due to filtration through its walls into the other channel.

Although the ends of the sheets forming the filter element may be supported in any suitable manner, it is preferred to support the inner end by means of a metal strip 31 extending longitudinally of receptacle 12 and having a laterally extending projection at each end secured to the adjoining ring 13. Strip 31 is spaced far enough from the receptacle to permit the inner end of the filter sheets to be inserted between them and supported thereby. The outer end of the sheets may be supported by a metal strip 32 inserted between them and held in place at its ends by the tapers 33 which are wrapped around the ends of the filter element to prevent it from unwinding.

While various sheet-like filtering elements may be used, it is preferred to use a porous cellulosic material in sheet form and of such porosity as to satisfactorily remove particles of dust of the size encountered in use. That is, for coarse dusts there may be used a cellulosic material sheet whose pores are coarser than those of a paper used in a respirator for fine particles, such as those of smokes. Most suitably the filter element is formed from cellulose fiber sheet treated to provide pore openings of critical size. Such critical pore size is obtainable by impregnating the pores of foraminous material, suitably cellulosic sheets, with finely divided substances which clog the larger pores to provide a filter the pores of which will prevent passage of particles to be filtered out, i. e., to provide critical pore size.

The finely divided substance used will depend, of course, largely on the desired critical pore size and the pores in the original cellulosic material. For many purposes, however, satisfactory results are had by impregnating the filter with finely divided carbon. This is accomplished suitably by cracking gases such as methane, ethane, ethylene and acetylene, or vaporized liquids such as kerosene and gasoline. Thus, such gases and vapors are ignited from a suitable burner and the supply of air then reduced so that the gas or vapor burns in part and is cracked in part to produce finely divided carbon. The smoke thus produced is then passed through the foraminous material to impregnate its pores in the manner just described. Other smokes may also be used, such as those produced be evaporation, dilution and condensation, or by reaction of two gases, such as hydrogen chloride and ammonia, or by dilution of zinc vapor accompanied by its oxidation. Also, two layers of material treated to restrict the larger pores may be superimposed to provide critical pore size.

This is described and claimed, for example, in United States Patents No. 1,798,164 to Harry A. Kuhn and William A. Boyle, No. 1,814,190 to R. L. Sebastian and L. Finkelstein and No. 1,818,155 to N. E. Oglesby and R. S. Brown. These filter materials have the advantage that they can be adapted to the removal of even the finest dusts, it being possible by the treatments described in the aforesaid patents to render the pore openings less than 1 micron in size, while at the same time providing filters that are efficient and of not unduly high breathing resistance.

An air-purifying canister constructed in accordance with this invention is relatively small and compact, but offers low breathing resistance. Consequently, the individual using the canister is capable of greater or more prolonged physical effort because his energy is not reduced by labored breathing. Even though the pores of the filter become clogged to some extent in use, the area of the filter is great enough to permit substantially effortless breathing to be continued.

The particular shape of filter element shown in which there are adjoining spiral channels for air is especially desirable because it permits large surface area to be obtained without materially increasing the diameter of the filter, whereby a comparatively small canister can be used. The impure air drawn into the canister can flow through either channel to the perforated receptacle, but regardless of the path the air takes, it must pass through one wall of one of the channels before it can enter the receptacle, whereby the air is filtered.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. An air-purifying element comprising two sheets of filter material disposed face to face with their body portions spaced apart and their ends sealed together, said sheets being wound spirally upon themselves in spaced relation to form a filter element having inner and outer walls, the sheet forming the inner wall being longer than the other sheet to thereby form the outer wall of said element.

2. An air-purifying element comprising a plurality of sheets of filter material disposed face to face with their body portions spaced apart and their ends sealed together, said sheets being wound spirally upon themselves to form spaced involutions, the sheet forming the inner wall of the inner involution being long enough to form the outer wall of the element, and strips of material disposed between the edges of said sheets for retaining the sheets spaced apart.

3. An air-purifying element comprising two sheets of filter material disposed face to face with their body portions spaced apart and their ends sealed together, said sheets being wound spirally upon themselves to form a filter element having a central area surrounded by spaced involutions of the sheets, the sheet forming the side wall of said area being longer than the other sheet and being wound an additional turn to form the outer wall of the filter element whereby said sheets form two adjoining spiral channels, the outer channel being closed at its outer end with its inner end opening into said central area, and the inner channel being closed at its inner end with its outer end opening to the space surrounding said element.

4. An air-purifying element comprising two sheets of filter material disposed face to face with their body portions spaced apart and their ends sealed together, said sheets being wound spirally upon themselves to form a filter element having a central area surrounded by spaced involutions of the sheets, the sheet forming the side wall of said area being longer than the other sheet and being wound an additional turn to form the outer wall of the filter element whereby said sheets form two adjoining spiral channels, the outer channel being closed at its outer end with its inner end opening into said central area, and the inner channel being closed at its inner end with its outer end opening to the space surrounding said element, and spiral spacing means disposed in said channels between the edges of said sheets for holding the sheets apart, the spacing means in said outer channel being tapered toward the closed outer end thereof, and the spacing means in said inner channel being tapered toward the closed inner end of the inner channel.

5. An air-purifying element comprising a plurality of sheets of filter material disposed face to face with their body portions spaced apart and their ends sealed together, said sheets being formed from a single strip of filter material folded upon itself and wound spirally to form spaced involutions, and the sheet forming the inner wall of the element being long enough to form the outer wall of the element.

EMERSON VENABLE.